United States Patent
Pressley et al.

(10) Patent No.: US 8,260,290 B2
(45) Date of Patent: Sep. 4, 2012

(54) SYSTEM AND METHOD FOR INBOUND ROAMING IN IP MULTIMEDIA SUBSYSTEM NETWORKS

(75) Inventors: Todd A. Pressley, Superior, CO (US); Kevin Stiles, Allen, TX (US); Serdar Sahin, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 575 days.

(21) Appl. No.: 12/276,617

(22) Filed: Nov. 24, 2008

(65) Prior Publication Data

US 2010/0085937 A1    Apr. 8, 2010

Related U.S. Application Data

(60) Provisional application No. 61/102,452, filed on Oct. 3, 2008.

(51) Int. Cl.
*H04W 4/00* (2009.01)
(52) U.S. Cl. ....................................................... 455/433
(58) Field of Classification Search .............. 455/433
See application file for complete search history.

(56) References Cited

U.S. PATENT DOCUMENTS

| | | | |
|---|---|---|---|
| 7,251,254 B2 * | 7/2007 | Bond et al. ............... | 370/467 |
| 7,536,184 B2 * | 5/2009 | Poczo ..................... | 455/432.3 |
| 2004/0228324 A1 * | 11/2004 | Alexiou et al. .......... | 370/352 |
| 2006/0092925 A1 | 5/2006 | Svensson et al. | |

FOREIGN PATENT DOCUMENTS

EP   1 962 541 A1   8/2008

OTHER PUBLICATIONS

Azada, Maria et al. Seamless Mobility Across IMS and Legacy Circuit Networks. Bell Labs Technical Journal 10(4), 25-38 (2006).

* cited by examiner

*Primary Examiner* — Lester Kincaid
*Assistant Examiner* — Joel Ajayi (57) ABSTRACT

A system and method for enabling a UE to roam to a visited IMS-based network from a home network that does not have an IMS infrastructure. A visiting UE sends to an Intelligent Roaming Application Server (I-RAS) in the visited network, a first SIP Registration message that includes a SIP URI identifying the UE as a visitor from a home network that does not have an IMS infrastructure. The I-RAS rejects the registration, but includes a temporary Tel URI in the rejection message. The UE sends a second Registration message using the temporary Tel URI, which is forwarded to a Visited S-CSCF for authentication. The S-CSCF returns authentication vectors, which the UE uses to compute ciphering parameters and establish an IPSEC connection with a Visited P-CSCF. The UE then sends a third Registration message, which is accepted, and registration in the visited network is complete. The I-RAS acts as a pseudo Visited MSC/VLR and performs an update location procedure with the visiting UE's home network.

24 Claims, 10 Drawing Sheets

SYSTEM AND METHOD FOR INBOUND ROAMING IN IP MULTIMEDIA SUBSYSTEM NETWORKS

CROSS-REFERENCE TO RELATED APPLICATIONS

This application claims the benefit of U.S. Provisional Application No. 61/102,452 filed Oct. 3, 2008, the disclosure of which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to communication systems. More particularly, and not by way of limitation, the invention is directed to a system and method for providing inbound roaming to an IMS-based network from 3GPP Home Networks that do not have an IMS infrastructure.

The IP Multimedia Subsystem (IMS), as defined by the Third Generation Partnership Project (3GPP), merges telephony and Internet technology by providing an all-IP based architecture for the telecommunications industry. The IMS is based on the Session Initiation Protocol (SIP) and makes heavy use of the protocols defined within the Internet Engineering Task Force (IETF). The system offers a network of servers and databases that assist a user agent with the task of establishing and managing sessions. IMS uses the term "sessions" because the connections between users are no longer limited to voice services (i.e., a phone call). Sessions may be voice, video, text, or other services connecting two or more user agents.

Figure 1:
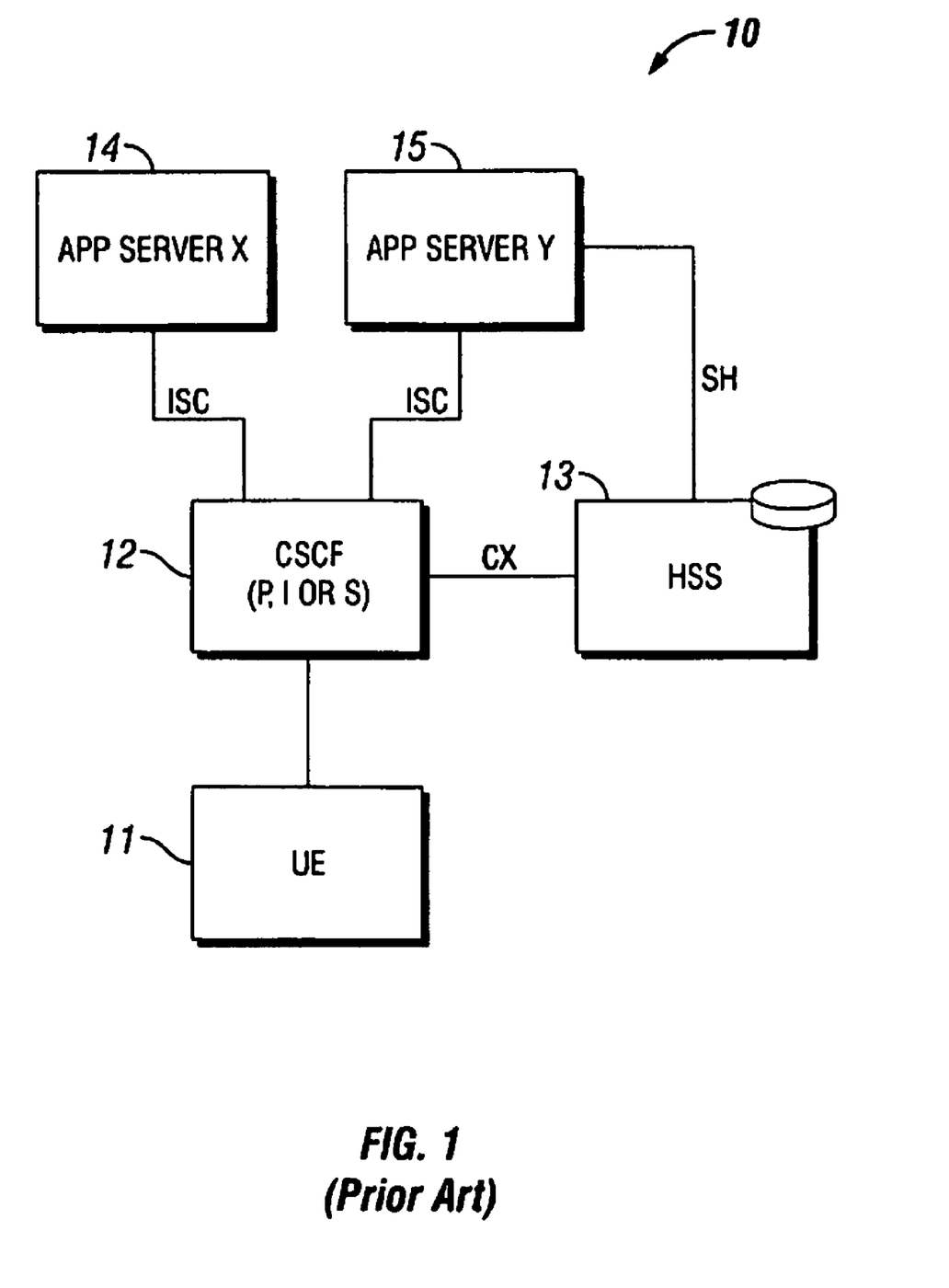
FIG. 1 (Prior Art) is a simplified block diagram of the existing logical network architecture for IMS.

FIG. 1 is a simplified block diagram of the existing logical network architecture 10 for IMS. The IMS architecture includes a User Equipment (UE) 11, a Call Session Control Function (CSCF) 12, a Home Subscriber Server (HSS) 13, and Application Servers 14 and 15. The UE 11 is a device carried by a user that contains a SIP User Agent for initiating or terminating sessions. The CSCF 12 is responsible for managing the sessions including security and interconnection. There are three types of CSCFs. A Proxy CSCF (P-CSCF) sits at the edge of the network and is the entry point for the UE into the IMS core network. An Interrogating CSCF (I-CSCF) serves as the entry point into the network for peer networks. It also acts as a lookup function for finding the appropriate serving node for a subscriber. A Serving CSCF (S-CSCF) is responsible for authenticating the UE and managing ongoing sessions for the UE including invocation of applications. The S-CSCF communicates with the HSS 13 in order to retrieve the UE authentication information. After the user has been authenticated, the S-CSCF again communicates with the HSS, this time to retrieve the user profile, which specifies the services to which the user subscribes and which application servers are to be invoked for those services.

The HSS 13 stores the relevant user data including authentication information and service data. As part of the user profile, initial Filter Criteria (iFC) are defined to indicate which application servers are to be invoked based on information in the signaling plane. Application Servers 14 and 15 are invoked based on the iFCs that are stored in the user profile. The S-CSCF passes signaling to an Application Server if the criteria defined in the iFC are met. Once invoked, the application server participates in the session and provides additional capabilities.

Figure 2A:
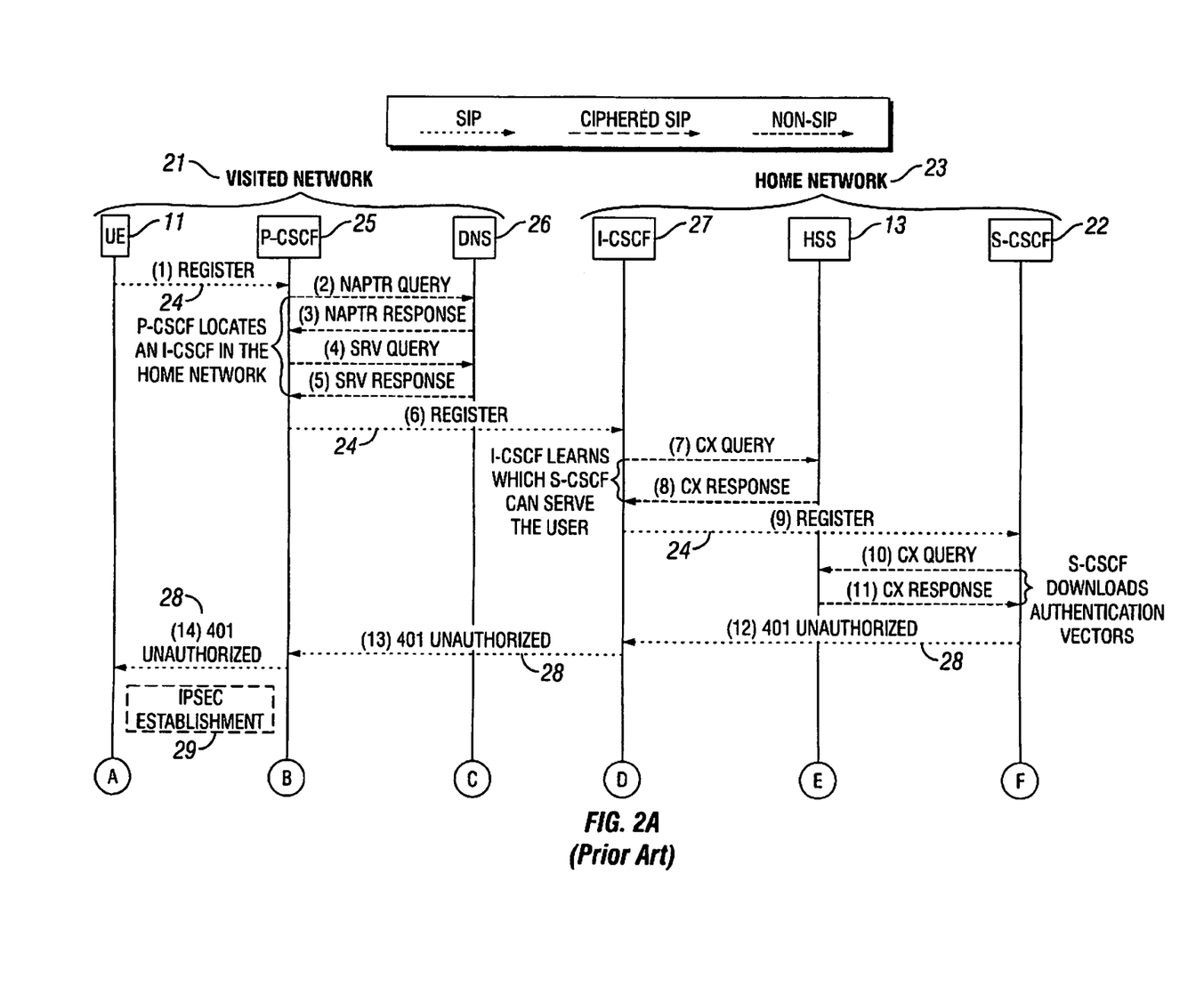
FIG. 2 (Prior Art) is a call flow diagram illustrating the steps involved in an existing procedure for UE registration in an IMS network.
Figure 2B:
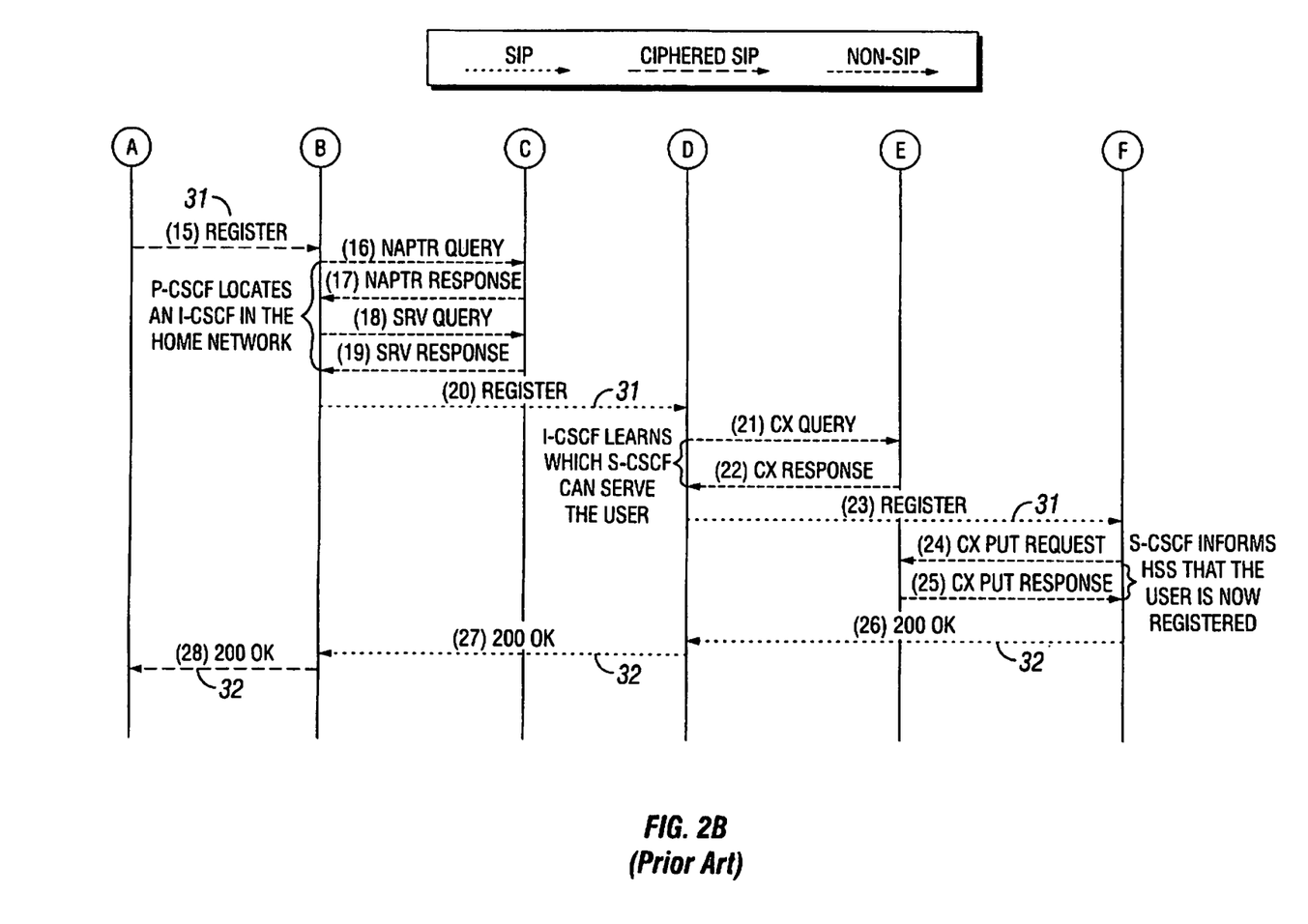

FIGS. 2A-2B are portions of a call flow diagram illustrating the steps involved in an existing procedure for UE registration in an IMS network. 3GPP Technical Specification TS 23.228 requires the service control for Home-subscribed services for a roaming subscriber to be in the Home Network. In other words, the Serving CSCF must be located in the UE's Home Network. Thus, FIGS. 2A-2B illustrate UE 11 in Visited Network 21 registering with the Serving CSCF 22 in the Home Network 23.

Referring to FIG. 2A, the UE sends a SIP REGISTER message 24 to a Visited P-CSCF 25 to initiate the registration process. The Visited P-CSCF queries a Domain Name Server (DNS) 26 to locate a Home I-CSCF 27 in the Home Network 23 of the user based on the SIP Uniform Resource Identifier (URI) used by the UE. The Visited P-CSCF then forwards the REGISTER message to the Home I-CSCF. The Home I-CSCF 27 queries the HSS 13 to learn which Home S-CSCF 22 serves the user. The HSS responds with the information needed to determine the S-CSCF that will service this UE, and the Home I-CSCF forwards the REGISTER message to the appropriate S-CSCF 22.

The S-CSCF 22 queries the HSS 13 to retrieve the authentication information for the UE 11. The HSS responds with the authentication information, and the S-CSCF sends a 401 response message 28 back to the Home I-CSCF 27 to reject the REGISTER but includes authentication vectors so that the UE can authenticate. The 401 response message is returned to the UE via the Visited P-CSCF 25. The UE computes ciphering parameters based on the authentication information received in the 401 response message and establishes an IPSEC connection 29 with the Visited P-CSCF.

Referring to FIG. 2B, the UE 11 then uses the authentication information received in the 401 response message 28 to continue the registration process. The UE sends another SIP REGISTER message 31 to the Visited P-CSCF 25, and includes the authentication information. The Visited P-CSCF queries the DNS 26 to locate a Home I-CSCF 27 in the Home Network 23 of the user based on the SIP URI used by UE. The Visited P-CSCF sends the REGISTER message to the Home I-CSCF, which queries the HSS 13 to learn which Home S-CSCF 22 serves the user. The I-CSCF then forwards the REGISTER message to the S-CSCF. The S-CSCF verifies the authentication information from the UE and notifies the HSS that it will be servicing the UE.

The HSS 13 acknowledges the assignment and provides the S-CSCF 22 with the User Profile. The S-CSCF then sends a 200 OK response 32 back to the UE 11 via the Home I-CSCF 27 and the Visited P-CSCF 25. Based on initial Filter Criteria (iFC) for this user, the Home S-CSCF 22 may also initiate a 3rd Party Registration towards a Home Application Server 14/15 (FIG. 1). In this case, the Home Application Server responds with a 200 OK response back to the Home S-CSCF. After the UE 11 has registered with the Home Network 23, it can initiate a session. All session initiation traffic flows through the Visited P-CSCF 25, the Home S-CSCF 22 and, depending on session type, through the Home Application Server 14/15.

In 3GPP circuit-switched (CS) networks, the roaming user first attaches to the Visited Network where the Visited Network informs a Home HLR. Incoming calls to the user are handled utilizing a Mobile Station Roaming Number (MSRN) assigned by the Visited Network. The Home Network is not involved in outgoing calls.

Figure 3:
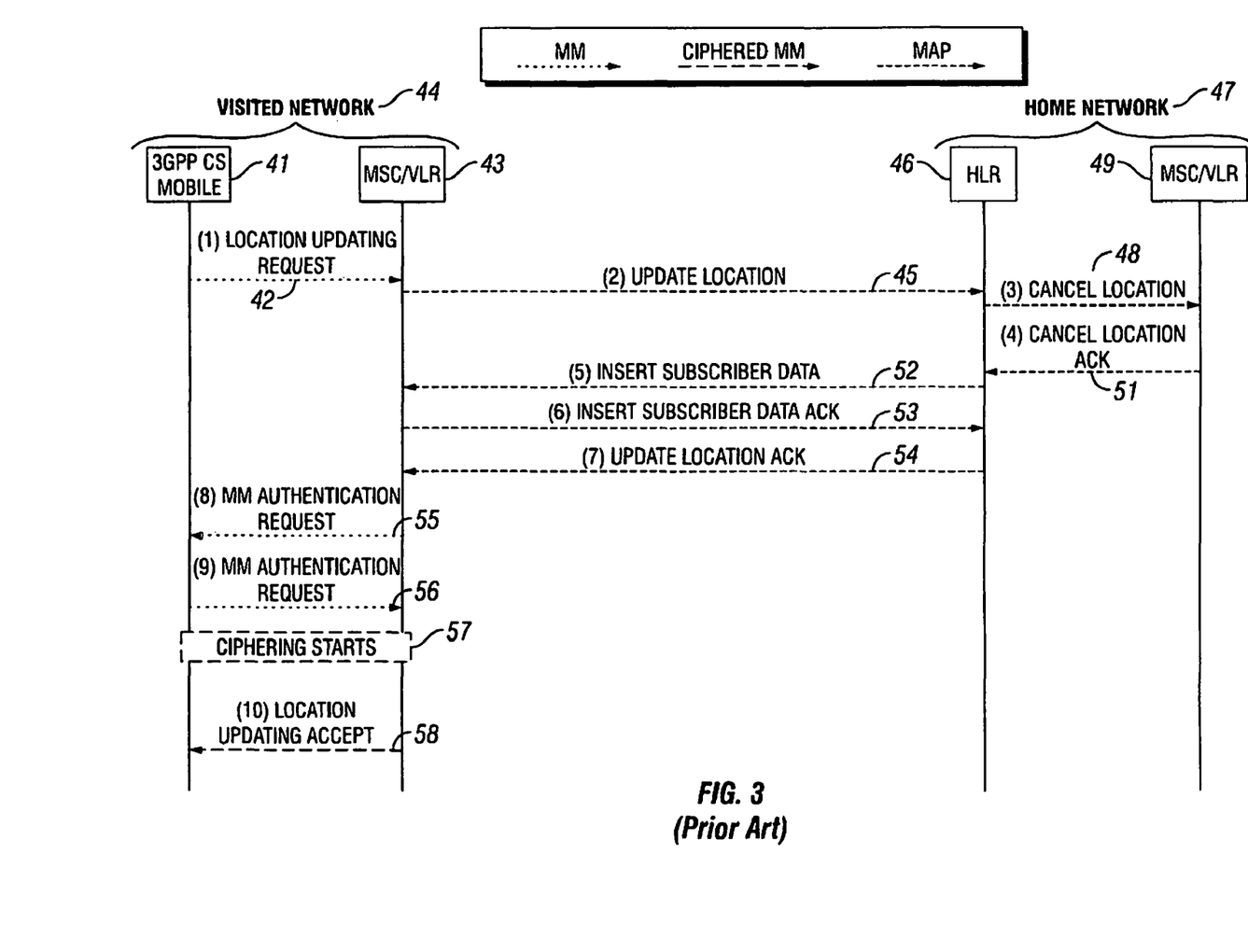
FIG. 3 (Prior Art) is a call flow diagram illustrating the steps involved in an existing Mobile Attach procedure in a 3GPP circuit-switched network.

FIG. 3 is a call flow diagram illustrating the steps involved in an existing Mobile Attach procedure in a 3GPP CS network. A 3GPP CS Mobile Station (MS) 41 sends a Mobility Management (MM) LOCATION UPDATE REQUEST 42 to a Visited MSC/VLR 43 in a Visited Network 44. The Visited MSC/VLR sends an UPDATE LOCATION message 45 to a Home HLR 46 in a Home Network 47 using the International Mobile Subscriber Identity (IMSI) provided by the MS. The Home HLR sends a Mobile Application Part (MAP) CANCEL LOCATION message 48 to a Home MSC/VLR 49. The Home MSC/VLR responds with a MAP CANCEL LOCATION ACK message 51, and the Home HLR sends a MAP INSERT SUBSCRIBER DATA message 52 to the Visited MSC/VLR 43, which contains the details of the subscriber profile and authentication vectors. The Visited MSC/VLR responds with A MAP INSERT SUBSCRIBER DATA ACK message 53, and the Home HLR sends a MAP UPDATE LOCATION ACK message 54 to the Visited MSC/VLR acknowledging the UPDATE LOCATION message 45. At this point the Home HLR knows the subscriber is roaming, or visiting, in the visited network.

The Visited MSC/VLR 43 then sends an MM AUTHENTICATION REQUEST message 55 to the MS 41 using authentication vectors received from the Home HLR 46. The MS responds with an MM AUTHENTICATION RESPONSE message 56, which includes a response to the authentication challenge sent by the Visited MSC/VLR. Using the outcome from the authentication process, the MS and MSC/VLR initiate ciphering over the air at 57. All messages are ciphered over the air from this point forward. The Visited MSC/VLR 43 then sends an MM LOCATION UPDATING ACCEPT message 58 to the MS in response to the MS's MM LOCATION UPDATE REQUEST 42. At this point, the MS is attached to the Visited Network 44.

Figure 4:
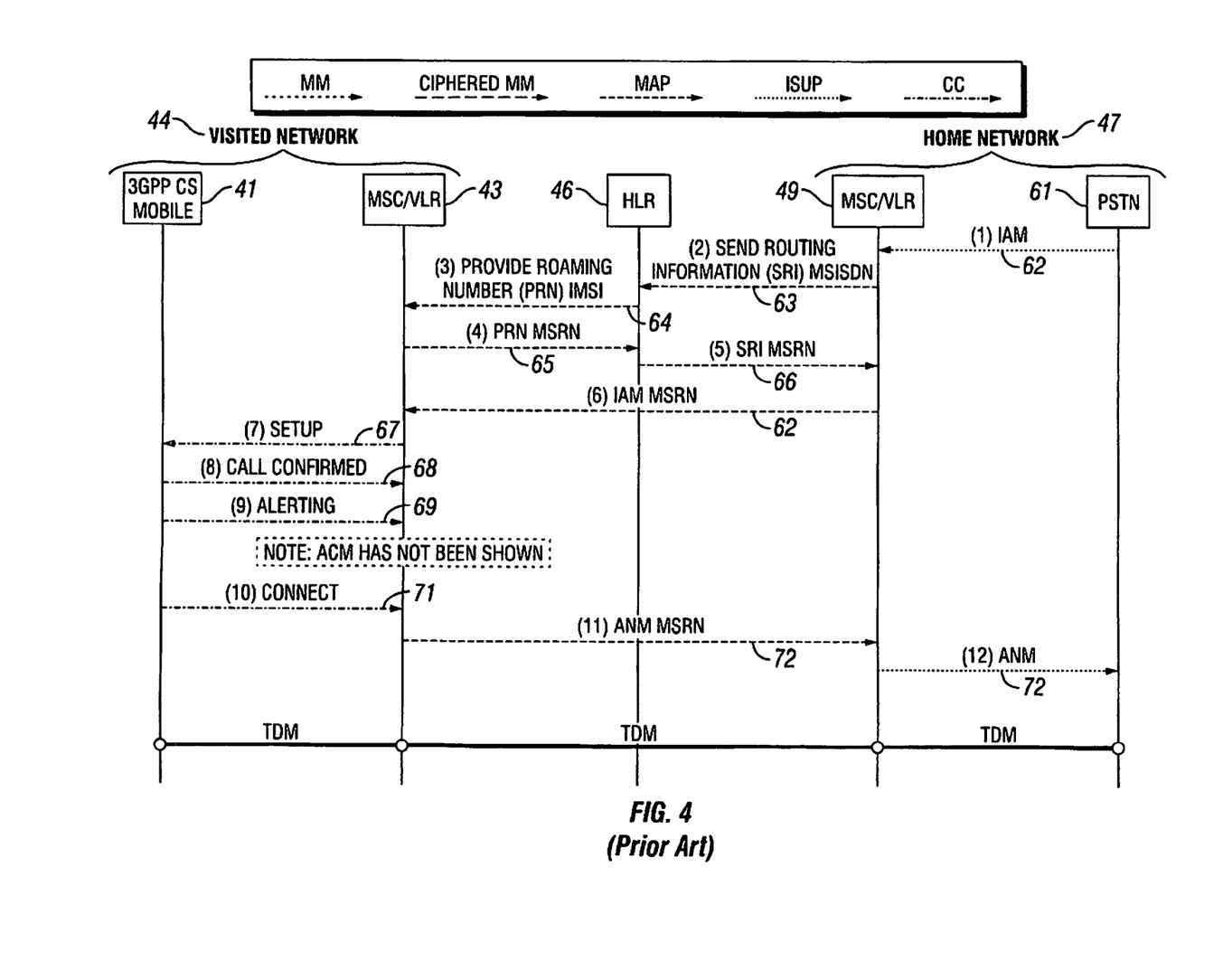
FIG. 4 (Prior Art) is a call flow diagram illustrating the steps involved in an existing procedure for a mobile terminating call in a 3GPP CS network.

FIG. 4 is a call flow diagram illustrating the steps involved in an existing procedure for a mobile terminating call in a 3GPP CS network. In this scenario, the Home MSC/VLR 49 receives a call from the Public Switched Telephone Network (PSTN) 61 through an ISDN User Part (ISUP) Initial Address Message (IAM) message 62, which is destined for the MS 41 roaming in the Visited Network 44. The Home MSC/VLR sends a MAP SEND ROUTING INFORMATION (SRI) message 63 to the Home HLR 46. The Home HLR in turn sends a MAP PROVIDE ROUTING NUMBER (PRN) message 64 to the Visited MSC/VLR 43. The Visited MSC/VLR responds with the MSRN at 65. The Home HLR 46 then responds to the Home MSC/VLR 49 with a MAP SRI message 66 containing the MSRN.

The Home MSC/VLR 49 uses the MSRN and forwards the ISUP IAM request 62 to the Visited MSC/VLR 43. The Visited MSC/VLR sends a CC SETUP message 67 to the MS 41. The MS responds by sending a CC CALL CONFIRMED message 68 to the Visited MSC/VLR. The MS then starts ringing and informs the Visited MSC/VLR with a CC ALERTING message 69. For simplicity, the Address Complete Message (ACM) has not been shown. The MS then sends a CC CONNECT message 71 to the Visited MSC/VLR when the call is answered. The Visited MSC/VLR then sends an ISUP Answer Message (ANM) 72 to the Home MSC/VLR 49. The Home MSC/VLR then forwards the ANM message to the PSTN 61. At this point, the call is established between the calling PSTN user and the called Mobile user.

As defined in 3GPP TS 23.228 (Version 7.12.0), the current solution enables inbound roaming to a pure VoIP IMS-based 3GPP-based network only from 3GPP Home Networks that have an IMS infrastructure. This is because the service control must always be located in the Home Network.

SUMMARY

Notably, existing solutions do not address the inbound roaming case in which the Home Network does not have an IMS infrastructure. Since many operators worldwide may not have an IMS infrastructure, a solution is needed which addresses inbound roaming to a pure VoIP IMS-based 3GPP-based network from 3GPP circuit-switched Home Networks that do not have an IMS infrastructure. Currently, the 2G, 3G, or the IMS roaming case do not solve the problem. The present invention provides a system and method for achieving these results.

The present invention is directed to a system and method for enabling a User Equipment (UE) to roam to a visited IP Multimedia Subsystem (IMS)-based network from a home network that does not have an IMS infrastructure. In one embodiment, this is accomplished by using an Intelligent Roaming Application Server (I-RAS) that assigns temporary SIP URIs to the User Equipment (UE) that can be used in the Visited Network and that acts as a pseudo MSC/VLR towards the Home Network.

In one embodiment, the present invention is directed to a system for enabling a UE to roam to a visited IMS-based network from a home network that does not have an IMS infrastructure. The system includes an I-RAS in the visited network, which includes means for assigning a temporary identifier to the UE for use while roaming in the visited network; and means for acting as a pseudo MSC/VLR towards the home network. The means for assigning a temporary identifier may include means for receiving a first registration request message originated by the UE, the first registration request message including a SIP URI designated for identifying UEs visiting from home networks that do not have an IMS infrastructure. The system sends to the UE, a rejection message including the temporary Tel URI.

The system may also include means for assisting registration of the UE in the visited network. The registration assisting means includes means for receiving a second registration request message originated by the UE, the second registration request message including the temporary Tel URI; means for marking the temporary Tel URI as being used so that the temporary Tel URI is not assigned to any other UEs until the temporary Tel URI is released; and means for obtaining subscriber profile information from the home network.

In another embodiment, the present invention is directed to a method of enabling a UE to roam to a visited IMS-based network from a home network that does not have an IMS infrastructure. The method includes the steps of determining that the UE is visiting from a home network that does not have an IMS infrastructure; assigning a temporary identifier to the UE for use while roaming in the visited network; and acting as a pseudo MSC/VLR towards the home network. The method may also include receiving in an I-RAS in the visited network, a registration request message originated by the UE, the registration request message including a SIP URI designated for identifying UEs visiting from home networks that do not have an IMS infrastructure; and sending to the UE, a rejection message that includes the temporary Tel URI.

The method may also include the step of assisting registration of the UE in the visited network. The registration assisting step includes the following steps performed in the I-RAS: receiving a second registration request message originated by the UE, the second registration request message including the temporary Tel URI; marking the temporary Tel URI as being used so that the temporary Tel URI is not assigned to any other UEs until the temporary Tel URI is released; obtaining subscriber profile information from the home network; and sending an approval message to an S-CSCF handling the registration of the UE in the visited network.

In another embodiment, the present invention is directed to a method of enabling a UE to roam to a visited IMS-based network from a home network that does not have an IMS infrastructure. The method includes the steps of sending from a visiting UE to an I-CSCF in the visited network, a SIP Registration message that includes a SIP URI that identifies the UE as a visitor from a home network that does not have an IMS infrastructure; forwarding the SIP Registration message to an I-RAS in the visited network; sending a rejection message from the I-RAS to the visiting UE, the rejection message including a temporary Tel URI; sending a second SIP Registration message from the visiting UE, the second SIP Registration message including the temporary Tel URI; obtaining by the I-RAS, subscriber profile information from the UE's home network; and approving the registration of the visiting UE.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

As noted above, the present invention provides inbound roaming to a pure VoIP IMS-based 3GPP-based network from 3GPP Home Networks that do not have an IMS infrastructure. In one embodiment, this is accomplished by using an Intelligent Roaming Application Server (I-RAS) that assigns temporary SIP URIs to the UE that can be used in the Visited Network. The I-RAS also acts as a pseudo MSC/VLR towards the Home Network.

In the description that follows, several assumptions are made. First, it is assumed that roaming at the GPRS level is possible. In other words, the Home HLR supports GPRS packet data profiles. Second, the roaming user is allowed to use the Visited GGSN by the Home Network. Third, the UE has the intelligence required to utilize the guest SIP URIs described below. And fourth, the Visited IMS system relies on the authentication executed by the Visited SGSN and does not re-authenticate the user. Although the following description assumes GPRS roaming, the present invention can be used to realize roaming from circuit switched networks. For example, this may be accomplished by adding HLR functionality to the I-RAS and authorizing packet data services within the IMS-based, 3GPP-based network.

In 3GPP IMS, the User Equipment (UE) must first complete an IMS registration to be able to use communication services. As noted above, this registration must transpire with the Home Network as per 3GPP IMS standards. If the Home Network does not have an IMS infrastructure, the present invention enables the Visited Network to use the I-RAS to assign a temporary SIP URI to the UE, which the UE subsequently uses for IMS registration with the Visited Network and I-RAS. The I-RAS also acts as a pseudo MSC/VLR towards the Home Network. From the Home Network perspective, this looks like the user has roamed to another circuit-switched 3GPP-based network. From the Visited Network perspective, this looks like just another one of the Visited Network's own users.

Figure 5A:
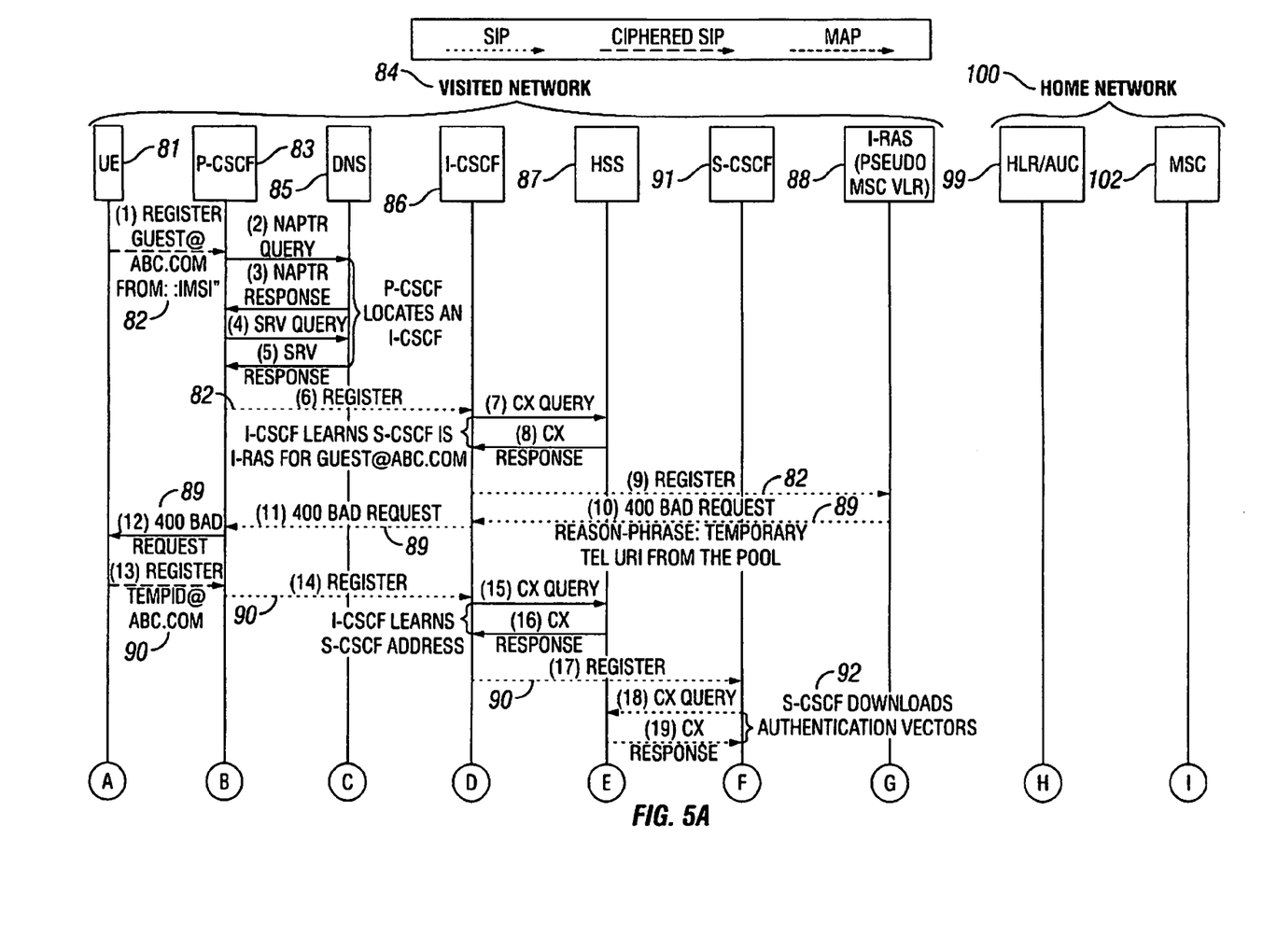
FIG. 5 is a call flow diagram illustrating the steps involved in an exemplary embodiment of a method for UE registration in an IMS network according to the teachings of the present invention.
Figure 5B:
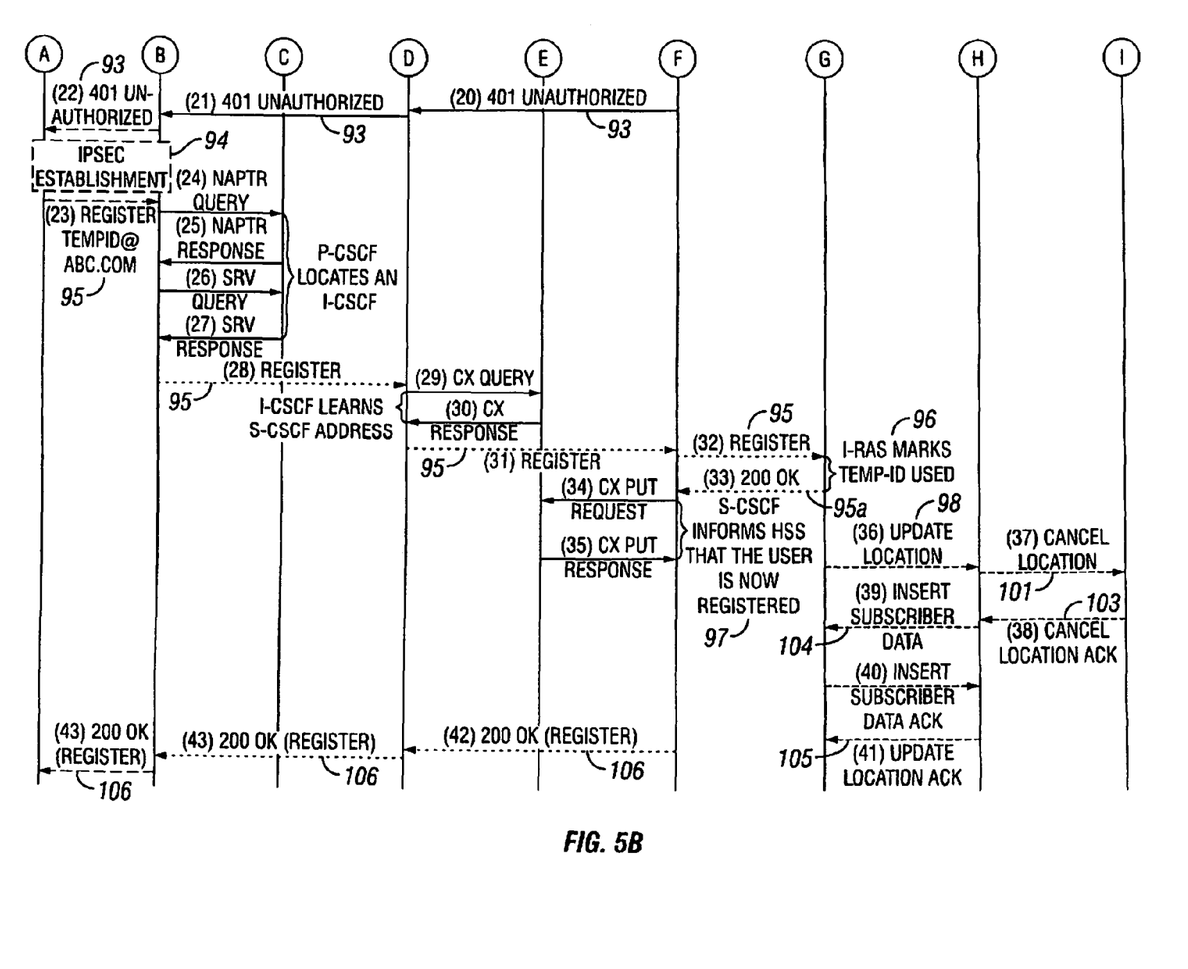

FIGS. 5A-5B are portions of a call flow diagram illustrating the steps involved in an exemplary embodiment of a method for UE registration in an IMS network according to the teachings of the present invention. FIGS. 5A-5B show how the I-RAS enables the IMS registration in this case. The invention utilizes an innovative end-to-end approach using standard protocols to overcome the roaming limitations explained above. New reference numbers are used for the UE and network nodes due to different capabilities being implemented therein in this embodiment of the present invention.

Referring to FIG. 5A, in a novel procedure, a UE 81 sends a SIP REGISTER message 82 to a Visited P-CSCF 83 using guest@abc.com or a similar pre-defined SIP URI for use in the Visited Network 84 to identify UEs visiting from home networks that do not have an IMS infrastructure. The UE reads an IMSI from its SIM card or similar 3GPP device (such as USIM or UICC) and places the IMSI in the "From" field of the SIP REGISTER message. The Visited P-CSCF queries a DNS 85 to locate a Visited I-CSCF 86 in the Visited abc.com Network based on the SIP URI supplied by the UE. The Visited P-CSCF then sends the SIP REGISTER message 82 to the Visited I-CSCF.

The Visited I-CSCF 86 queries a Visited HSS 87 to learn which Visited S-CSCF serves guest@abc.com. In another novel procedure, the Visited HSS has been provisioned with the guest@abc.com profile to redirect the IMS registration requests towards a Visited I-RAS 88 to address inbound roaming scenarios instead of the existing procedure of directing the registration requests toward the S-CSCF. The Visited HSS returns the identity of the Visited I-RAS to the Visited I-CSCF in the query response, and the Visited I-CSCF sends the SIP REGISTER message 82 to the Visited I-RAS 88. The Visited I-RAS rejects this request and sends to the Visited I-CSCF, a SIP 400 BAD REQUEST message 89 using REASON-PHRASE: TempID@abc.com, where TempID@abc.com is a temporary Tel URI assigned from a predefined list within the Visited I-RAS. In this novel step, the temporary Tel URIs are also defined within the Visited HSS 87, and they are within the numbering range of the Visited Network 84. As the I-RAS assigns the temporary Tel URI, it also associates and stores the IMSI received from the UE 81 for later use in an Update Location message 98.

The Visited I-CSCF 86 forwards the SIP 400 BAD REQUEST message 89 to the Visited P-CSCF 83, which in turn delivers the message to the UE 81. In another novel step, the UE sends a second SIP REGISTER message 90 to the Visited P-CSCF 83, this time using the URI, TempID@abc.com. The Visited P-CSCF sends the SIP REGISTER message 90 to the Visited I-CSCF. The Visited I-CSCF queries the Visited HSS 87 to learn which Visited S-CSCF serves TempID@abc.com. The Visited HSS responds with the information needed to determine the Visited S-CSCF that will service this UE, and the Visited I-CSCF forwards the SIP REGISTER message to the identified Visited S-CSCF 91. At 92, the Visited S-CSCF 91 queries the Visited HSS 87 to retrieve authentication information for the UE 81, and the Visited HSS responds with the authentication information.

Referring to FIG. 5B, the Visited S-CSCF sends a 401 (Unauthorized) response message 93 back to the Visited I-CSCF 86 to reject the REGISTER message, but includes authentication vectors so that the UE can authenticate. The 401 response message 93 is returned to the UE via the Visited P-CSCF 83. The UE 81 computes ciphering parameters based on the authentication information received in the 401 response message and establishes an IPSEC connection 94 with the Visited P-CSCF 83.

The UE 81 then uses the authentication information received in the 401 response message 93 to continue the registration process. The UE then sends a third SIP REGISTER message 95 to the Visited P-CSCF 83, and includes the authentication information. The Visited P-CSCF queries the DNS 85 to locate a Visited I-CSCF 86 in the Visited Network 84 of the user based on the SIP URI used by the UE. The Visited P-CSCF sends the REGISTER message to the Visited I-CSCF, which queries the HSS 87 to learn which Visited S-CSCF 91 serves this UE. The I-CSCF then forwards the REGISTER message 95 to the Visited S-CSCF. The Visited S-CSCF verifies the authentication information from the UE and notifies the HSS 87 that the Visited S-CSCF will be servicing the UE.

Based on initial Filter Criteria (iFC) defined in the Visited HSS profile, the Visited S-CSCF 91 also forwards the SIP REGISTER message 95 to the Visited I-RAS 88. In another novel step 96, the Visited I-RAS marks the particular TempID@abc.com as used and does not assign it to any other users until it is released. Note that there are multiple methods to assign and release the temporary identifier. The method described here is exemplary of one possible method. The Visited I-RAS then sends a SIP 200 OK message 95a to the Visited S-CSCF, and at 97, the Visited S-CSCF informs the Visited HSS 87 that the user is now registered, and the Visited HSS sends back an acknowledgment.

The Visited I-RAS 88 then sends a MAP UPDATE LOCATION message 98 to a Home HLR/AUC 99 in the UE's Home Network 100. In a novel step, the Visited I-RAS uses the IMSI acquired from the UE in the original SIP REGISTER MESSAGE 82 to identify the Home HLR/AUC. The Home HLR/AUC sends a MAP CANCEL LOCATION message 101 to a Home MSC 102, and the Home MSC responds with an acknowledgement. The Home HLR/AUC then sends a MAP INSERT SUBSCRIBER DATA message 104 containing details of the subscriber profile to the Visited I-RAS 88, and the Visited I-RAS responds with an acknowledgement. The Home HLR/AUC then sends a MAP UPDATE LOCATION ACK message 105 to the Visited I-RAS acknowledging the MAP UPDATE LOCATION message 98. The Visited S-CSCF 91 then sends a SIP 200 OK message 106 to the I-CSCF 86 responding to the third SIP REGISTER message 95. The I-CSCF then forwards the SIP 200 OK message to the P-CSCF 83, which delivers it to the UE 81. At this point, the UE is registered with the Visited Network 84, and the Home Network 100 knows the subscriber is roaming, or visiting, in the Visited Network 84.

Figure 6:
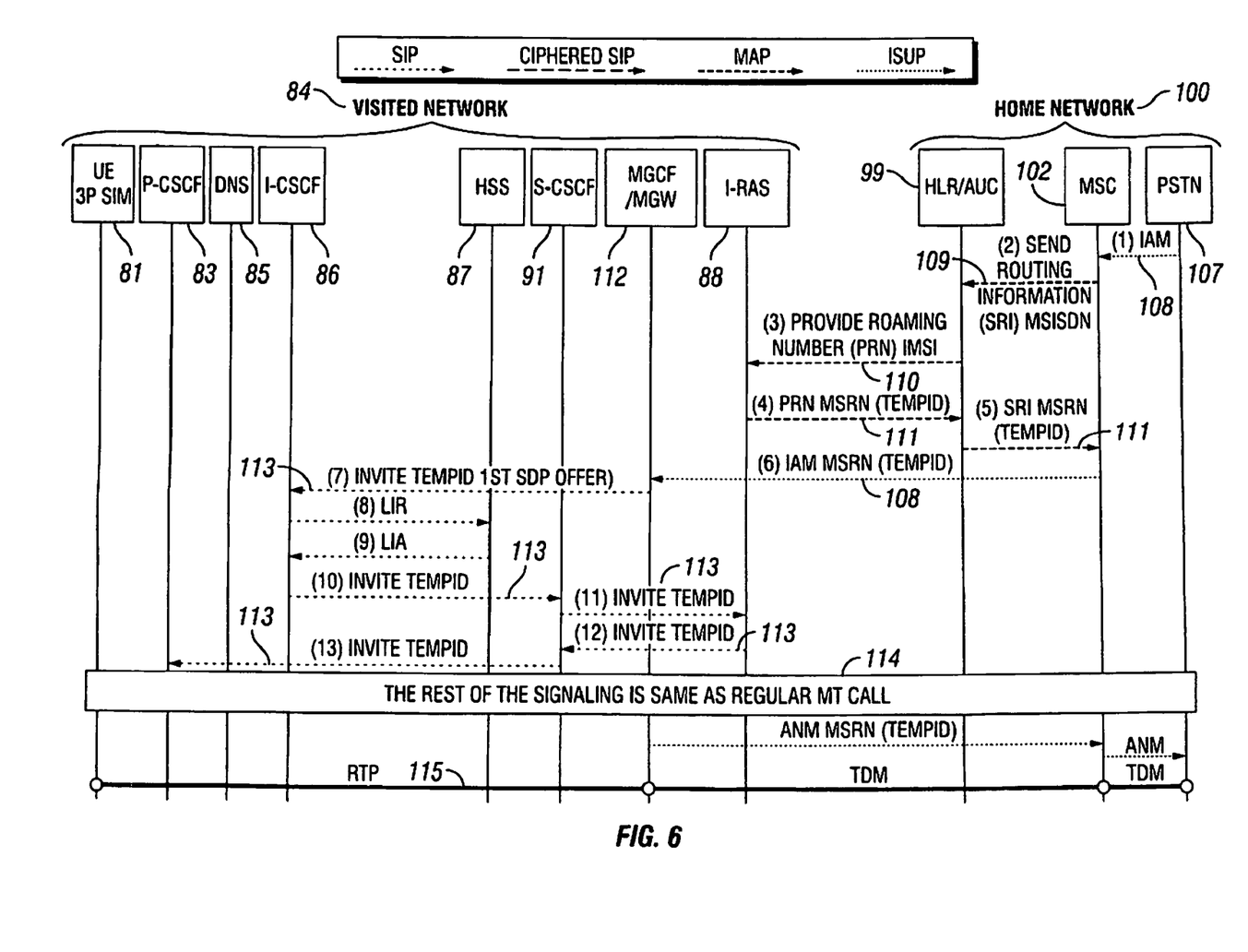
FIG. 6 is a call flow diagram illustrating the steps involved in an exemplary embodiment of a method for receiving a mobile terminated call from the PSTN in an IMS network according to the teachings of the present invention.

FIG. 6 is a call flow diagram illustrating the steps involved in an exemplary embodiment of a method for receiving a mobile terminated call from the PSTN 107 in a Visited IMS network 84 according to the teachings of the present invention. From the point of view of the Home Network 100, the user has roamed into another 3GPP circuit-switched network where the Visited I-RAS 88 appears to be a corresponding Visited MSC/VLR. As such, the roaming query request using MAP PROVIDE ROAMING NUMBER (PRN) message 110 is sent from the Home HLR/AUC 99 towards the Visited I-RAS 88 where the Visited I-RAS responds by providing a Mobile Station Roaming Number (MSRN) 111 that corresponds to the TempID assigned to the subscriber during IMS registration procedure of FIG. 5. Here the TempID is used as the MSRN and allows the call to be completed. The Visited I-RAS 88 is always in the call establishment path, and does not allow calls if the roaming user does not have the necessary privileges defined in the Home HLR/AUC 99. Here, the Visited I-RAS performs the role of a pseudo Visited Network MSC/VLR in order to carry out standard 3GPP roaming behavior where the Visited Network MSC/VLR, the I-RAS in this scenario, uses the Home HLR profiles to allow or disallow the use of network features.

The call flow begins as the Home MSC 102 receives a call from the PSTN 107 through an ISUP IAM message 108, which is destined for a UE 81 roaming in the Visited Network 84. The Home MSC sends a MAP SEND ROUTING INFORMATION (SRI) message 109 to the Home HLR/AUC 99. The Home HLR/AUC in turn sends a MAP PROVIDE ROUTING NUMBER (PRN) message 110 to the Visited I-RAS 88 in the Visited Network. In a novel step, the Visited I-RAS responds by returning to the Home HLR/AUC, a PRN MSRN 111 with the TempID that was assigned to the roaming user during IMS registration. The Home HLR/AUC responds to the Home MSC with a MAP SRI message containing the TempID as the MSRN 111. The Home MSC uses the TempID as the MSRN and forwards the ISUP IAM request 108 to a Visited Media Gateway Control Function/Media Gateway (MGCF/MGW) 112 in the Visited Network 84. The Visited MGCF sends a SIP INVITE message 113 to the Visited I-CSCF 86.

The Visited I-CSCF 86 queries the Visited HSS 87 using a DIAMETER LOCATION INFORMATION REQUEST (LIR) message 114 to learn which Visited S-CSCF is serving the user that was assigned the TempID, and the Visited HSS responds with a Visited S-CSCF address using a DIAMETER LOCATION INFORMATION ANSWER (LIA) message. The Visited I-CSCF then forwards the SIP INVITE message 113 to the Visited S-CSCF 91. Based on the initial filter criteria (iFC) in the TempID's Visited HSS profile, the Visited S-CSCF forwards the SIP INVITE to the Visited I-RAS 88. In a novel step, the Visited I-RAS checks the request in the SIP INVITE message against the user's profile that was fetched from the Home HLR/AUC 99 during registration and either allows or rejects the request based on Operator Determined Barring. In the illustrated case, the Visited I-RAS allows the call and redirects the SIP INVITE message 113 back to the Visited S-CSCF 91. The Visited S-CSCF subsequently forwards the SIP INVITE message to the Visited P-CSCF 83.

As noted at 114, the remainder of the signaling is the same as any other MT call within the Visited Network from the perspective of IMS. A speech path 115 is established using RTP between the UE 81 and the Visited MGW 112, using Time Division Multiplexing (TDM) between the Visited MGW and the Home MSC 102, and TDM between the Home MSC and the PSTN 107.

Figure 7:
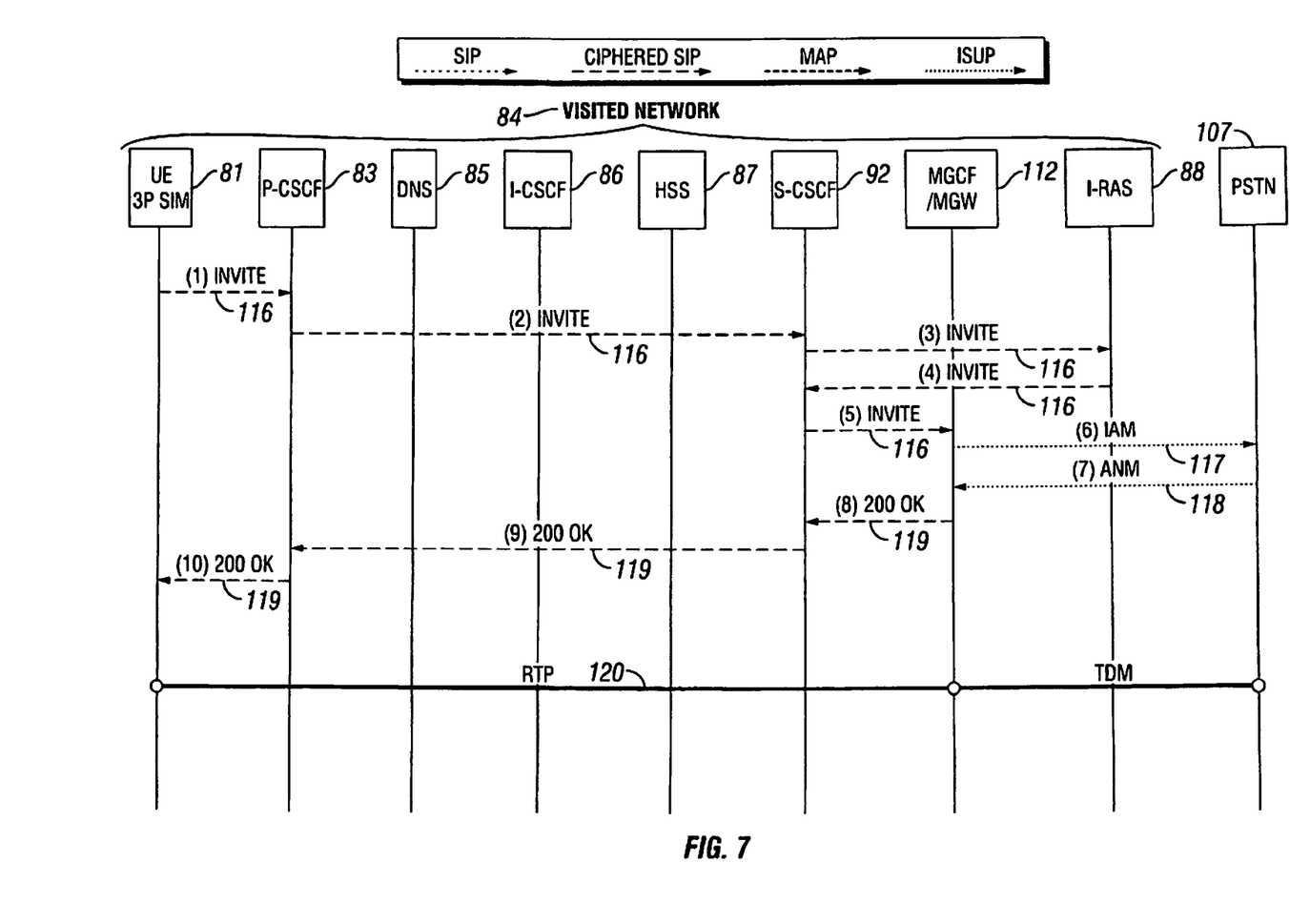
FIG. 7 is a call flow diagram illustrating the steps involved in an exemplary embodiment of a method for placing a mobile originated call to the PSTN in an IMS network according to the teachings of the present invention.

FIG. 7 is a call flow diagram illustrating the steps involved in an exemplary embodiment of a method for placing a mobile originated call to the PSTN 107 in an IMS network according to the teachings of the present invention. The scenario for a mobile originated call to the PSTN is similar to a call made by a user belonging to the Visited Network with the exception that the Visited I-RAS 88 is in the call establishment path and does not allow calls if the roaming user does not have the necessary privileges defined in the Home HLR/AUC 99.

The call flow begins as the UE 81 sends to the Visited P-CSCF 83, a SIP INVITE message 116 destined for a PSTN number. The Visited P-CSCF forwards the SIP INVITE message to the Visited S-CSCF 91. Based on the iFC in the TempID's Visited HSS profile, the Visited S-CSCF forwards the SIP INVITE message to the Visited I-RAS 88. In a novel procedure, the Visited I-RAS checks the request in the SIP INVITE message against the user's profile that was fetched from the Home HLR/AUC 99 during registration and either allows or rejects the request based on Operator Determined Barring. In the case shown here, the Visited I-RAS allows the call and redirects the SIP INVITE message 116 back to the Visited S-CSCF 91. The Visited S-CSCF forwards the SIP INVITE message to the Visited MGCF 112. The rest of the call flow is the same as a regular Mobile Originated Call to PSTN scenario from the IMS perspective. The Visited MGCF sends an ISUP IAM message 117 to the PSTN 107, which returns an ISUP ANM message 118. The Visited MGCF then sends a SIP 200 OK message 119 to the Visited S-CSCF 91, which then forwards the message to the P-CSCF 83, which delivers it to the UE 81. A speech path 120 is established using Real Time Protocol (RTP) between the UE 81 and the Visited MGW 112, and using TDM between the Visited MGW and the PSTN 107.

Figure 8:
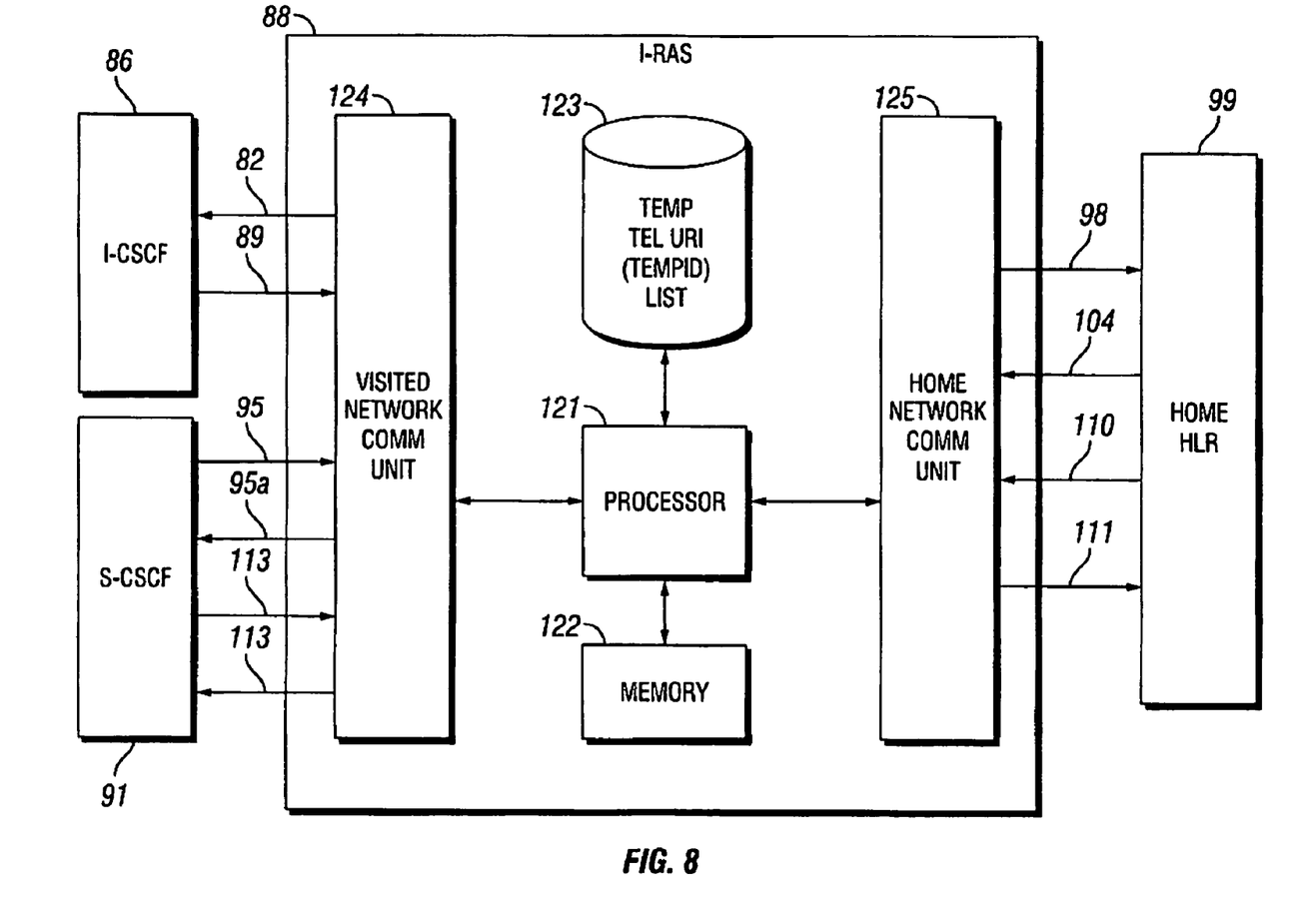
FIG. 8 is a simplified block diagram of an Intelligent Roaming Application Server (I-RAS) in an exemplary embodiment of the present invention.

FIG. 8 is a simplified block diagram of the Intelligent Roaming Application Server (I-RAS) 88 in an exemplary embodiment of the present invention. As noted previously, the I-RAS assigns temporary SIP URIs to the UE 81 that can be used in the Visited Network 84, and also acts as a pseudo MSC/VLR towards the Home Network 100. The I-RAS includes a processor 121, which accesses program instructions in an internal or external memory 122 in order to perform the I-RAS functions. The processor also access a list of temporary TEL URIs (TempIDs) 123 utilized to respond to messages received from the Visited I-CSCF 86, the Visited S-CSCF 91, and the Home HLR 99. A visited network communication unit 124 provides communications with the visited network nodes, and a home network communication unit 125 provides communications with the Home HLR. It is to be understood that each of the communication units includes a plurality of message generation units (not shown) for generating, sending, and receiving different messages. The visited network communication unit 124 primarily sends and receives SIP messages while the home network communication unit 125 primarily sends and receives MAP messages.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A system for enabling a User Equipment (UE) to roam to a visited IP Multimedia Subsystem (IMS)-based network from a home network that does not have an IMS infrastructure, said system comprising:
the UE for sending an access request to the IMS-based network, the access request being received by an Intelligent Roaming Application Server (I-RAS) in the IMS-based network;
a connection between the I-RAS and the UE and between the I-RAS and the visited network, said I-RAS comprising:
a storage means for storing temporary SIP URIs for use, in the visited IMS-based network, as temporary identifiers for visiting UEs;
a receiving means for receiving a first registration request message originated by the UE, the first registration request message including a pre-defined SIP URI, for identifying the UE as visiting from a home network without an IMS infrastructure;
sending means for sending a rejection of the first registration request message to the UE, the rejection including a temporary SIP URI;
a registration assisting means for receiving a second registration request message from the UE, the second registration request including the temporary SIP URI as a temporary identifier to the UE for use while roaming in the visited network; and
means for acting as a pseudo MSC/VLR towards the home network.

2. The system as recited in claim 1, wherein the I-RAS includes means for associating and storing an International Mobile Subscriber Identity (IMSI) of the UE to the temporary SIP URI for use in an Update location message.

3. The system as recited in claim 2, wherein the temporary SIP URI is a telephone (Tel) URI.

4. The system as recited in claim 1, wherein the means for sending a rejection message to the UE sends a SIP 400 BAD REQUEST message and inserts the temporary Tel URI as the REASON-PHRASE.

5. The system as recited in claim 1, said registration assisting means further comprising:
means for marking the temporary Tel URI as being used so that the temporary Tel URI is not assigned to any other UEs until the temporary Tel URI is released; and
means for obtaining subscriber profile information from the home network.

6. The system as recited in claim 5, further comprising an apparatus in the UE for sending the first registration request message including the pre-defined SIP URI designated for identifying UEs visiting from home networks that do not have an IMS infrastructure.

7. The system as recited in claim 6, wherein the apparatus in the UE also includes:
means for receiving the rejection message including the temporary Tel URI; and
means for sending the second registration request message including the temporary Tel URI.

8. The system as recited in claim 1, further comprising a visited Home Subscriber Server (HSS) in the visited network, said visited HSS including:
the database of pre-defined SIP URIs designated for identifying UEs visiting from home networks that do not have an IMS infrastructure;
means for determining that the first registration request message originated by the UE contains one of the predefined SIP URIs designated for identifying UEs visiting from home networks that do not have an IMS infrastructure; and means for redirecting the first registration request message to the I-RAS in response to determining that the first registration request message originated by the UE contains one of the pre-defined SIP URIs designated for identifying UEs visiting from home networks that do not have an IMS infrastructure.

9. The system as recited in claim 8, wherein the visited HSS also includes a database for storing a plurality of temporary Tel URIs.

10. The system as recited in claim 9, wherein the plurality of temporary Tel URIs are within a numbering range of the visited network.

11. A method of enabling a User Equipment (UE) to roam to a visited IP Multimedia Subsystem (IMS)-based network from a home network that does not have an IMS infrastructure, said method comprising the steps of:

sending a first registration request message from the UE to the IMS-based network;

receiving in an Intelligent Roaming Application Server (I-RAS) in the visited network, the first registration request message, said first registration request message including a pre-defined SIP URI to identify the UE as visiting from a home network that does not have an IMS infrastructure;

the I-RAS rejecting the first registration request and assigning a temporary identifier to the UE for use while roaming in the visited network, said temporary identifier including a pre-defined SIP URI from a database of temporary SIP URIs;

the I-RAS receiving a second registration request from the UE, the second registration request including the temporary SIP URI; and the I-RAS acting as a pseudo MSC/VLR towards the home network.

12. The method as recited in claim 11, wherein the I-RAS includes means for associating and storing an International Mobile Subscriber Identity (IMSI) of the UE to the temporary SIP URI for use in an Update location message.

13. The method as recited in claim 12, wherein the temporary SIP URI is a telephone (Tel) URI.

14. The method as recited in claim 11, further comprising the step of:

sending a rejection message to the UE, said rejection message including the temporary Tel URI.

15. The method as recited in claim 14, wherein the step of sending a rejection message to the UE includes sending a SIP 400 BAD REQUEST message that includes the temporary Tel URI as the REASON-PHRASE.

16. The method as recited in claim 14, further comprising the step of assisting registration of the UE in the visited network, said registration assisting step comprising the following steps performed in the I-RAS:

receiving a second registration request message originated by the UE, said second registration request message including the temporary Tel URI;

marking the temporary Tel URI as being used so that the temporary Tel URI is not assigned to any other UEs until the temporary Tel URI is released; and obtaining subscriber profile information from the home network.

17. The method as recited in claim 11, further comprising the following steps performed in the UE:

sending the first registration request message including the SIP URI designated for identifying the UE visiting from a home network that does not have an IMS infrastructure;

receiving the rejection message including the temporary Tel URI; and sending the second registration request message including the temporary Tel URI.

18. The method as recited in claim 11, further comprising the following steps performed by a visited Home Subscriber Server (HSS) in the visited network having a database of SIP URIs designated for identifying UEs visiting from home networks that do not have an IMS infrastructure:

in response to determining that the first registration request message originated by the UE contains one of the SIP URIs designated for identifying UEs visiting from home networks that do not have an IMS infrastructure, redirecting the first registration request message to the I-RAS.

19. The method as recited in claim 18, further comprising storing a plurality of temporary Tel URIs in a database in the visited HSS.

20. The method as recited in claim 19, wherein the step of storing a plurality of temporary Tel URIs includes storing temporary Tel URIs that are within a numbering range of the visited network.

21. A method of enabling a User Equipment (UE) to roam to a visited IP Multimedia Subsystem (IMS)-based network from a home network that does not have an IMS infrastructure, said method comprising the steps of:

sending from a visiting UE to an I-CSCF in the visited network, a first SIP Registration message that includes a SIP URI that identifies the UE as a visitor from a home network that does not have an IMS infrastructure;

forwarding the SIP Registration message from the I-CSCF to an Intelligent Roaming Application Server (I-RAS) in the visited network;

sending a rejection message from the I-RAS to the visiting UE, said rejection message including a temporary Tel URI;

sending a second SIP Registration message from the visiting UE, the second SIP Registration message including the temporary Tel URI;

registering the visiting UE by the I-RAS; and performing by the I-RAS, an update location procedure with the UE's home network.

22. The method as recited in claim 21, wherein the step of performing the update location procedure includes sending an Update Location message from the I-RAS to a Home HLR using an International Mobile Subscriber Identity (IMSI) provided by the visiting UE in the first SIP Registration message; and storing and associating the IMSI to the temporary Tel URI.

23. The method as recited in claim 21, further comprising marking the temporary Tel URI as used until the temporary Tel URI is released.

24. The method as recited in claim 21, further comprising, after sending the second SIP Registration message from the visiting UE, the steps of:

authenticating the visiting UE by a Serving Call Session Control Function (S-CSCF) and returning a response message including authentication vectors;

computing ciphering parameters by the visiting UE based on the authentication vectors received in the response message;

establishing by the visiting UE, an IPSEC connection with a Visited Proxy CSCF (P-CSCF);

sending a third SIP Registration message from the visiting UE to the P-CSCF; and forwarding the third SIP Registration message to the I-RAS.

* * * * *